(12) United States Patent
Meisen

(10) Patent No.: US 6,767,529 B2
(45) Date of Patent: Jul. 27, 2004

(54) PROCESS FOR PRODUCING MAGNETITE PARTICLES

(75) Inventor: Ulrich Meisen, Kall (DE)

(73) Assignee: Bayer Aktiengesellschaft, Leverkusen (DE)

( * ) Notice: Subject to any disclaimer, the term of this patent is extended or adjusted under 35 U.S.C. 154(b) by 259 days.

(21) Appl. No.: 10/047,315

(22) Filed: Jan. 14, 2002

(65) Prior Publication Data

US 2002/0130296 A1 Sep. 19, 2002

(30) Foreign Application Priority Data

Jan. 17, 2001 (DE) .......................................... 101 01 769

(51) Int. Cl.$^7$ .............................................. C01G 49/00
(52) U.S. Cl. ...................... 423/632; 423/140; 423/142; 423/144
(58) Field of Search ................. 423/632, 140, 423/142, 144; 106/456; 252/62.56

(56) References Cited

U.S. PATENT DOCUMENTS

| 3,970,738 A | 7/1976 | Matsui et al. ............... 423/140 |
| 4,753,680 A | 6/1988 | Burow et al. ............... 106/304 |
| 4,990,189 A | 2/1991 | Wiese et al. ................ 106/456 |

FOREIGN PATENT DOCUMENTS

| DE | 32 09 469 | 9/1982 |
| DE | 216 040 | 11/1984 |
| DE | 284 478 | 11/1990 |
| EP | 0566790 | 10/1993 |
| EP | 0826635 | 3/1998 |
| EP | 08832848 | 4/1998 |
| GB | 1535889 | 12/1978 |
| GB | 2040904 | 9/1980 |
| JP | 51-44298 | 4/1976 |

*Primary Examiner*—Steven Bos
(74) *Attorney, Agent, or Firm*—Godfried R. Akorli; Diderico Van Eyl; Jill Denesvich

(57) ABSTRACT

This invention relates to a process for producing magnetite particles having a coercivity of 6.366 kA/m to 10.345 kA/m (=80 to 130 Oe) and an octahedral particle shape, comprising heating an alkaline component and an iron(II) component in the form of an aqueous solution to a temperature of 50° C. to 100° C., whereby the molar ratio of iron(II) component to one equivalent of alkaline component is 0.38 to 0.45, and treating the suspension with an oxidizing agent at a rate of oxidation of 20 to 50 mol. % Fe(II)/h until the iron compound has an Fe(III) content of more than 65 mol. %, and then again adding an Fe(II) component in the form of an aqueous solution at a molar ratio of Fe(II) to one equivalent of total alkaline component used is 0.47 to 0.49, and treating the suspension with an oxidizing agent, at a rate of oxidation is 20 to 50 mol. % Fe(II)/h until the iron compound has an Fe(III) content of more than 65 mol. %, and filtering the suspension, and washing, drying and grounding the residue.

5 Claims, No Drawings

PROCESS FOR PRODUCING MAGNETITE PARTICLES

BACKGROUND OF THE INVENTION

The invention relates to a process for producing magnetite particles.

Particulate magnetites produced from aqueous solutions by a precipitation process have been known for a long time. The production of magnetite by precipitation of iron(II) sulfate using an alkaline component and subsequent oxidation by air has already been described in U.S. Pat. No. 802,928. The production of magnetites by the precipitation process is likewise described in numerous subsequent publications.

The production of magnetites by the precipitation process with the addition of silicon is described in JP-A 51 044 298. Pure precipitated magnetites without added foreign elements can be produced batchwise according to DE-A 3 209 469 or continuously according to DE-A 2 618 058. Normally, the iron(II) salt used is $FeSO_4$.

It is possible, however, to use any soluble iron(II) salt for the production of a magnetite by the precipitation process. The use of $FeCl_2$, as described in DE-A 3 004 718, is particularly suitable here. The use of $FeSO_4$ or of $FeCl_2$ has the advantage that both substances can be obtained very economically in large quantities as waste products of the iron-working industry. Suitable precipitating agents, besides the most frequently used sodium hydroxide, are CaO or $CaCO_3$ (DE-A 3 004 718), ammonia (DE-A 2 460 493) or $Na_2CO_3$, $MgCO_3$ or MgO (EP-A 0 187 331). Air is generally used as the oxidizing agent. However, oxidation processes using nitrates (DD-A 216 040 and DD-A 284 478) are also described.

The magnetites have been used primarily for producing all kinds of pigments. The particular advantage of magnetites over organic pigments and carbon black is their far better resistance to weathering, so that pigments containing magnetite can also be used outdoors. Precipitated magnetites are also usually employed for coloring concrete moldings such as concrete paving stones or concrete roofing tiles.

Magnetites have also been used for a long time in electrophotography for the production of toners. Magnetites which have been obtained by the precipitation process are preferably employed for producing toners for photocopiers using one-component toners. The magnetic toners used for this purpose must have several properties. With the progressive development and improvement of photocopiers and printers, ever greater demands are placed on the magnetic toners and consequently on the magnetite used in them. The most recent generation of printers achieves a resolution of more than 400 dpi (dots per inch), for which it was necessary to develop finely divided toners having a very narrow particle-size distribution. The result of this was that the magnetites used for this purpose must likewise possess a very narrow particle-size distribution. A specific particle size is also necessary in order to ensure a homogeneous distribution of the magnetite particles in the final toner. The magnetites must themselves have an electrical resistance high enough to stabilize the latent image during electrostatic transfer. Furthermore, coercivity, saturation magnetization and, above all, the remanent magnetization must all be in the correct relationship to the field strengths prevailing in the machine.

It is an object of the present invention to provide a technically particularly simple and therefore also economic process for producing magnetites having a coercivity of 80 to 130 Oe (=6.366 kA/m to 10.345 kA/m) and an octahedral particle shape for the production of magnetic toners. This object can be achieved by the process according to the invention.

SUMMARY OF THE INVENTION

The invention relates to a process for producing a magnetite having a coercivity of 6.366 kA/m to 10.345 kA/m (=80 to 130 Oe) and an octahedral particle shape by a) placing an alkaline component in the form of an aqueous solution under a protective gas, b) heating the alkaline component to a temperature of 50° C. to 100° C., c) adding an iron(II) component in the form of an aqueous solution whereby the molar ratio of iron(II) component to one equivalent of alkaline component is 0.38 to 0.45, while maintaining the temperature at 50° C. to 100° C., d) treating the suspension obtained in c) with an oxidizing agent, whereby the rate of oxidation is 20 to 50 mol. % Fe(II)/h until the iron compound has an Fe(III) content of more than 65 mol. %, e) after the oxidation in d), again adding an Fe(II) component in the form of an aqueous solution to the suspension obtained in d) whereby the molar ratio of Fe(II) in c) to one equivalent of total alkaline component used is 0.47 to 0.49, f) treating the suspension obtained in e) with an oxidizing agent, whereby the rate of oxidation is 20 to 50 mol. % Fe(II)/h until the iron compound has an Fe(III) content of more than 65 mol. %, g) filtering the suspension, and washing, drying and grounding the residue.

DETAILED DESCRIPTION OF THE INVENTION

Surprisingly, it has been found that by increasing the ratio of Fe(II) to alkaline component to 0.38 to 0.44, at temperatures of 50° C. to 100° C., preferably at 70° C. to 90° C., and by rapid oxidation (up to 50 mol. % Fe(II)), a magnetite which is usable in standard toners is obtained. Owing to the high rate of oxidation, the process is particularly economical because the plants can be utilized particularly efficiently.

The magnetites thus obtained can be used not only in magnetic toners, but also for coloring paper, plastic, paints, fibres and concrete, and in dyes.

Magnetites having a coercivity of 80 to 130 Oe (=6.366 kA/m to 10.345 kA/m) and an octahedral particle shape are obtainable by the following process according to the invention, wherein a) an alkaline component in the form of an aqueous solution is placed under a protective gas, b) the alkaline component is heated to a temperature of 50° C. to 100° C., preferably to 70° C. to 90° C., c) an iron(II) component in the form of an aqueous solution is added in a quantity such that the molar ratio of iron(II) component to one equivalent of alkaline component is 0.38 to 0.45, the temperature being maintained at 50° C. to 100° C., preferably 70° C. to 90° C., d) the suspension obtained in c) is treated with an oxidizing agent, with a rate of oxidation of 20 to 50 mol. % Fe(II)/h being established, until the iron compound has an Fe(III) content of more than 65 mol. %, e) after the oxidation in d), an Fe(II) component in the form of an aqueous solution is again added to the suspension obtained in d) in a quantity such that the molar ratio of Fe(II) used in c) to one equivalent of total alkaline component used is 0.47 to 0.49, f) the suspension obtained in e) is again treated with an oxidizing agent, with a rate of oxidation of 20 to 50 mol. % Fe(II)/h being established, until the iron compound has an Fe(III) content of more than 65 mol. %, and then g) filtered and the residue is washed, dried and ground.

The alkaline component preferably contains an alkali metal hydroxide, an alkaline-earth metal hydroxide, an alkaline-earth metal oxide, an alkali metal carbonate, $MgCO_3$ or ammonia The iron (II) component preferably contains a water-soluble Fe(II) salt, more preferably an iron sulfate or iron dichloride. It is also possible, however, to use other water-soluble Fe(II) compounds, in particular if they are available at comparable prices.

The oxidizing agent preferably contains atmospheric oxygen, pure oxygen, $H_2O_2$, chlorine, alkali metal chlorates (for example, NaOCl, $NaClO_3$, $NaClO_4$) or nitrates. Atmospheric oxygen, pure oxygen, $H_2O_2$ or sodium nitrate are more preferred.

A particularly preferred embodiment of the process according to the invention is described in more detail below.

Sodium hydroxide solution containing 300 g NaOH per liter of water is placed in a batch-operated stirred-tank reactor, with stirring under a flow of protective gas.

The solution is then heated to a temperature of between 50° C. and 100° C., preferably between 70° C. and 90° C. When this temperature has been attained, metering of the Fe(II) component is commenced. The Fe(II) component is calculated from the desired NaOH/Fe(II) ratio. If, for example, the aim is to achieve an NaOH/Fe(II) ratio of 0.55 and 100 mol NaOH has been introduced, then 100*0.55 =55 mol Fe(II) component must be added. The calculation of the alkali metal hydroxide/Fe(II) ratio is based on the equation

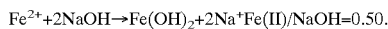
$Fe^{2+}+2NaOH \rightarrow Fe(OH)_2+2Na^+ Fe(II)/NaOH=0.50$.

If an alkaline component is used which reacts in a different stoichiometric ratio with the Fe(II) component to form $Fe(OH)_2$ or $FeCO_3$, the ratio must be correspondingly altered. This is the case, for example, where carbonates or alkaline-earth metal hydroxides or alkaline-earth metal oxides are used, so that in these cases the equation is as follows:

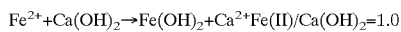
$Fe^{2+}+Ca(OH)_2 \rightarrow Fe(OH)_2+Ca^{2+} Fe(II)/Ca(OH)_2=1.0$ or

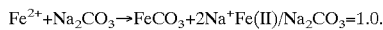
$Fe^{2+}+Na_2CO_3 \rightarrow FeCO_3+2Na^+ Fe(II)/Na_2CO_3=1.0$.

The Fe(II) component is metered preferably at such a rate such that no fall in temperature occurs. When the addition of the calculated quantity of the Fe(II) component is complete, the reaction mixture is optionally heated once more to 50° C. to 100° C. In many cases the temperature in b) and the temperature in c) are identical, so that a further heating step is not required in c). When this temperature has been attained, the aeration with protective gas is concluded and the addition of the oxidizing agent is commenced. In the case of an aeration using air, air is introduced via an aeration device below the stirrer. The quantity of air supplied per hour is between 5 and 15 l/h per mol Fe(II). Where $NaNO_3$ is used, the oxidizing agent is pumped in as an aqueous solution over a period of 5 to 30 minutes. The quantity required can be calculated from:

$NaNO_3[mol]=Fe(II)[mol]*0.67*\frac{1}{8}$.

For example, 100 mol Fe(II) would therefore require 8.375 mol $NaNO_3$. The quantities of the other oxidizing agents are calculated from the redox equivalents of the respective oxidizing agents. Here it should be borne in mind that at most only 66.6% of the Fe(II) has to be oxidized in order to produce magnetite.

The oxidation is concluded preferably when an Fe(III) content of more than 65 mol. % has been attained. This can be ascertained by redox titration.

Following this oxidation, an aqueous solution of an Fe(II) component is added until a ratio of Fe(II)/alkaline component of 0.47 to 0.49 is established. This further addition of Fe(II) serves to completely utilize the alkaline component used. If this step were not carried out, a considerable proportion of the alkaline component would enter the waste water, where it would have to be neutralized at some expense. Subsequently, oxidation is resumed at a rate of up to 50 mol. % Fe(II)/h, until an Fe(III) content of more than 65 mol. % is attained.

On conclusion of the second oxidation, the product is filtered, washed and dried. Prior to being dried, the product can be aftertreated in order to improve the thermostability and dispersibility. A polysiloxane or organic Ti ester can be preferably used for this.

The preferred conditions are as follows:

alkaline component: NaOH
Fe component: $FeSO_4$
reaction temperature: 80° C. to 90° C.
$FeSO_4$/NaOH: 0.43 to 0.41
rate of oxidation: 35 to 50 mol. % Fe(II)/h
$FeSO_4$/NaOH after the first oxidation: 0.48

The magnetites produced by the process according to the invention or the magnetites according to the invention can be used with particular advantage for the production of toners, printing inks and dye pastes for ink-jet printers.

The properties of the magnetites were measured by the following methods:

1. The color values were examined by preparing a paint: 3.2 g magnetite was ground in a microdismembrator (30") using an agate sphere of 10 mm in diameter. Then 2.0 g of the binder Alkydal® F48 (Bayer AG, Leverkusen, Del.), 0.1 g of the ground magnetite to be examined and 1.0 g $TiO_2$ (Bayertitan® R-FK2; Bayer AG, Leverkusen, Del.) were ground on a plate color rubbing machine (product of Engelsmann) having a diameter of 250 mm (also referred to as a muller).

The color values L* (brightness), a* (red) and b* (blue) were determined in accordance with DIN 55986, using Dataflash 2000 (d/8°), instrument A and the evaluation programme CIELAB 2 dated 19.10.1989. The entire procedure of color measurement is described in detail in EP-A 0 911 370.

2. The magnetic values (coercivity, specific saturation magnetization, specific remanent magnetization) were measured by a magnetometer (product of Bayer) at 5000 Oe field strength (corresponding to 397.9 kA.m$^{-1}$).

3. The BET surface area was measured in accordance with DIN 66 131. Gas mixture: 90% He, 10% $N_2$; measuring temperature: 77.4 K; heating at 140° C., 60 minutes.

4. Elemental analysis for Si and Mn:
Si was determined by spectral analysis, using ICP-OES.
Mn was determined by atomic absorption spectroscopy.

5. Elemental analysis for Fe (total), Fe(II) and Fe(III):

Determinations in accordance with DIN 55 913. The Fe content was determined by titration with $KMnO_4$ using a memotitrator (Mettler DL-70). The Fe(III) was determined similarly, using $TiCl_3$. The total iron content was calculated from the two individual values and the weighed portion. The concentrations of the two standard solutions were determined daily.

6. Particle shape and particle size:

Assessment of the particle size and particle shape from a transmission electron microscope (TEM) micrograph at 30,000 times magnification.

7. Elemental analysis for S:

Sulfur was determined by ICP-OES.

8. The water-soluble constituents were determined in accordance with ISO-EN 787 Part 3.

9. The pH value of the magnetite powder was determined in accordance with ISO-EN 787 Part 9.

The invention is illustrated in more detail by the following Examples.

EXAMPLES

Example 1

7876 g sodium hydroxide solution containing 300 g/l NaOH, corresponding to 46.67 mol NaOH, was placed in a stirred-tank reactor having a useful volume of 30 liters. The supply of nitrogen for aeration and the stirrer were set in operation and the sodium hydroxide solution was then heated to 80° C. Then 13.430 liters of iron(II) sulfate solution containing 237.54 g/l Fe(II), corresponding to 21 mol Fe(II), was pumped in over a period of 45 minutes. The $FeSO_4$/NaOH ratio was 0.45. The nitrogen supply was then turned off and the reaction mixture was aerated by means of 200 l/h air through an aeration ring installed below the stirrer. Aeration was discontinued when an Fe(III) content of 66 mol. % had been attained; subsequently aeration was resumed, using nitrogen. 1100 ml of $FeSO_4$ solution containing 237.54 g $FeSO_4$ per liter, corresponding to 1.72 mol $FeSO_4$, was then pumped in over period of 6 minutes. At this point, the $FeSO_4$/NaOH ratio was 0.487. The reaction mixture was then oxidised by 200 l/h air until the Fe(III) content was 66.8 mol. %.

On conclusion of oxidation, the suspension was filtered, washed thoroughly using deionized water and dried in air at 80° C. The powder obtained was ground in an impact mill.

The rate of oxidation was 28 mol. % Fe-II/h.

| | |
|---|---|
| brightness L* | 60.1 CIELAB |
| a* | −0.3 CIELAB |
| b* | −6.8 CIELAB |
| coercivity | 105 Oe = 8.355 kA/m |
| specific saturation magnetizm | 114.7 nT/m$^3$ |
| specific remanence | 24.1 nTm$^3$/g |
| particle size | 0.3 μm |
| S content | 0.02 wt. %, determined as $SO_3$ |
| Mn content | 0.21 wt. % |
| water-soluble constituents | 0.13 wt. % |
| DIN pH value | 8.2 |
| temperature stability | 140° C. |
| Fe(II) content | 29.1 mol. % |
| particle shape | octahedral |

Example 2

6800 kg NaOH, in the form of a solution containing 300 g/l NaOH, corresponding to 170 kmol NaOH, was placed in a stirred-tank reactor having a useful volume of 100 m$^3$. The supply of nitrogen for aeration and the stirrer were set in operation and the sodium hydroxide solution was then heated to 90° C. Then 39.3 m$^3$ of iron(II) sulfate solution containing 269.57 g/l Fe(II), corresponding to 69.74 kmol Fe(II), was pumped in over a period of 22 minutes. The $FeSO_4$/NaOH ratio was 0.41. The nitrogen supply was then turned off and the reaction mixture was aerated by means of 475 m$^3$/h air through an aeration ring installed below the stirrer. Aeration was discontinued when an Fe(III) content of 67 mol. % had been attained; subsequently aeration was resumed, using nitrogen. Then 5.9 m$^3$ of iron(II) sulfate solution containing 269.57 g/l $FeSO_4$ per liter, corresponding to 10.47 kmol $FeSO_4$, was pumped in. At this point, the $FeSO_4$/NaOH ratio was 0.472. The reaction mixture was then oxidised by 475 m$^3$/h air until the Fe(III) content was 66.8 mol. %.

The rate of oxidation was 22 mol. %/h

On conclusion of this reaction, the suspension was filtered, washed thoroughly using deionized water and spray dried in waste gas at 110° C. The powder obtained was ground in an impact mill.

The magnetite obtained had the following properties:

| | |
|---|---|
| brightness L* | 60.9 |
| a* | −0.3 |
| b* | −6.6 |
| BET surface area | 4.2 m$^2$/g |
| coercivity | 110 Oe = 8.753 kA/m |
| specific saturation magnetizm | 109.3 nT/m$^3$ |
| specific remanence | 20.9 nTm$^3$/g |
| particle size | 0.4 μm |
| S content | 0.09 wt. % $SO_3$ |
| Mn content | 0.24 wt. % |
| water-soluble constituents | 0.19 wt. % |
| DIN pH value | 8.6 |
| Fe(II) content | 29.0 mol. % |
| particle shape | octahedral |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a magnetite having a coercivity of 6.366 kA/m to 10.345 kA/m 80 to 130 Oe) and an octahedral particle shape comprising
    a) placing an alkaline component in the form of an aqueous solution under a protective gas,
    b) heating the alkaline component to a temperature of 50° C. to 100° C.,
    c) adding an iron(II) component in the form of an aqueous solution to the alkaline component obtained in b) whereby the molar ratio of iron(II) component to one equivalent of alkaline component is 0.38 to 0.45, while maintaining the temperature at 50° C. to 100° C.,
    d) treating a suspension obtained in c) with an oxidizing agent, whereby the rate of oxidation is 20 to 50 mol. % Fe(II)/h until the iron compound has an Fe(III) content of more than 65 mol. %,
    e) after the oxidation in d), again adding an Fe(II) component in the form of an aqueous solution to the suspension obtained in d) whereby the molar ratio of Fe(II) in c) to one equivalent of total alkaline component used is 0.47 to 0.49, f) treating a suspension obtained in e) with an oxidizing agent, whereby the rate of oxidation is 20 to 50 mol. % Fe(II)/h until the iron compound has an Fe(III) content of more than 65 mol. %, g) filtering a suspension obtained in f) with a resulting residue, and washing, drying and grinding the residue.

2. The process of claim 1 comprising b) heating the alkaline component to a temperature of 70° C. to 90° C.

3. The process of claim 1 wherein the alkaline component comprises ammonia, an alkali metal hydroxide, an alkaline-earth metal hydroxide, an alkaline-earth metal oxide or an alkali metal carbonate.

4. The process of claim 1 wherein the iron(II) component comprises iron sulfate or iron chloride.

5. The process of claim 1 wherein the oxidizing agent comprises atmospheric oxygen, $H_2O_2$, chlorine, an alkali metal chlorate or an alkali metal nitrate.

* * * * *